(12) United States Patent
Böhme et al.

(10) Patent No.: US 7,788,418 B2
(45) Date of Patent: Aug. 31, 2010

(54) MEASUREMENT OR PROTECTIVE DEVICE WITH INDEPENDENT SOFTWARE MODULES

(75) Inventors: Klaus Böhme, Berlin (DE); Gerhard Lang, Wilhelmshorst (DE); Oliver Woller, Theilheim (DE)

(73) Assignee: Siemens AG, Munich (DE)

( * ) Notice: Subject to any disclaimer, the term of this patent is extended or adjusted under 35 U.S.C. 154(b) by 232 days.

(21) Appl. No.: 11/916,369

(22) PCT Filed: Jun. 1, 2005

(86) PCT No.: PCT/DE2005/001006
§ 371 (c)(1),
(2), (4) Date: Dec. 3, 2007

(87) PCT Pub. No.: WO2006/128396
PCT Pub. Date: Dec. 7, 2006

(65) Prior Publication Data
US 2008/0189464 A1 Aug. 7, 2008

(51) Int. Cl.
*G06F 3/00* (2006.01)
(52) U.S. Cl. .......................................................... 710/8
(58) Field of Classification Search ....................... 710/8
See application file for complete search history.

(56) References Cited

U.S. PATENT DOCUMENTS

| | | | | |
|---|---|---|---|---|
| 4,999,785 A | * | 3/1991 | Schmuter | 382/150 |
| 6,072,783 A | * | 6/2000 | Riley | 370/294 |
| 2002/0143678 A1 | * | 10/2002 | Weik et al. | 705/35 |
| 2002/0173927 A1 | * | 11/2002 | Vandiver | 702/122 |
| 2005/0141681 A1 | * | 6/2005 | Graiger | 379/90.01 |
| 2007/0168745 A1 | * | 7/2007 | Alam et al. | 714/38 |

\* cited by examiner

*Primary Examiner*—Henry W. H. Tsai
*Assistant Examiner*—Kris Rhu
(74) *Attorney, Agent, or Firm*—Laurence A. Greenberg; Werner H. Stemer; Ralph E. Locher

(57) ABSTRACT

A measurement or protective device has a terminal for establishing a connection to a data bus. A control device determine the mode of operation of the measurement or protective device, and the mode of operation can be changed from the outside using the terminal. The novel device enables evaluation operations, in particular testing operations, from the outside in an even simpler manner than before. The control device is configured in such a manner that it can operate at least two software modules in parallel and independently of one another. One of the software modules is an operating module which determines the measurement or protective mode of operation of the device, and at least one additional software module has another function. The control device has at least one software interface to which the additional software module can be coupled, in terms of software, from the outside using the terminal.

8 Claims, 2 Drawing Sheets

MEASUREMENT OR PROTECTIVE DEVICE WITH INDEPENDENT SOFTWARE MODULES

BACKGROUND OF THE INVENTION

1. Field of the Invention

The invention relates to a measurement or protective appliance having a terminal for setting up a connection to a data bus and having a control device which stipulates the measurement or protection mode of operation of the measurement or protective appliance, the mode of operation being able to be altered externally via the terminal.

A protective appliance of this kind is sold by Siemens AG under the product name SIPROTEC, for example. In the case of this protective appliance, the mode of operation of the protective appliance can be altered externally via a data bus terminal by reparameterizing the appliance. This means that a new set of parameters is transmitted to the appliance and determines the properties of the appliance afresh.

2. Brief Summary of the Invention

The invention is based on the object of improving a measurement or protective appliance of the type described such that it allows evaluation operations, particularly test operations, externally even more easily than previously. In particular, evaluation or test operations are intended to be possible without the need for reparameterization of the entire measurement or protective appliance—that is to say alteration of the parameters which stipulate the mode of operation of the appliance.

This object is achieved by the invention on the basis of a measurement or protective appliance of the type indicated at the outset by means of the characterizing features of claim 1. Advantageous refinements of the invention are specified in subclaims.

Accordingly, the invention provides for the control device to be in a form such that it can operate at least two software modules in parallel with and independently of one another. One of the software modules is an operating module which stipulates the measurement or protection mode of operation of the measurement or protective appliance. At least one additional software module may have a further, that is to say another or additional, function. In line with the invention, the control device has at least one software interface to which the additional software module can be coupled by means of software externally via the terminal.

The essence of the invention is to provide a software interface within the measurement or protective appliance which allows external coupling of an additional software module or a plurality of additional software modules. A software interface of this kind can be used to install an additional software module in the protective appliance externally via an external data bus—for example via a station bus or a process bus—e.g. as part of service, maintenance or testing work (or the like) without the need to alter the configuration or parameterization of the operating module which stipulates the measurement or protection mode of operation of the measurement or protective appliance. The operating module thus remains unaltered, even though the mode of operation of the measurement or protective appliance is extended overall. Apart from the fact that reparameterization of the operating module is complex, reparameterization of the operating module always carries the risk of errors arising and of the originally correct functionality of the protective appliance being altered by mistake or rendered totally inoperative; the invention avoids such errors by means of the software interface and the option of implementing an additional software module.

Another advantage of the invention is that the additional software module can be configured very individually; there are no restrictions on the basis of only inadequate functionality of the operating module, since the operating module remains separate from other software modules.

By way of example, additional "test software modules" can be used to allow a test engineer to resort directly to the time-based samples from a measurement transducer connected to the input of the measurement or protective appliance, even though these data are normally not provided or output at the output on account of the configuration of the operating module and hence of the measurement or protection mode of operation of the measurement or protective appliance: if, by way of example, the protective appliance converts time-based samples from the measurement transducer into pointer values then the time-based samples are no longer available at the output. This problem can be solved by subsequently loading additional software modules.

The individual software interfaces are preferably separate from one another such that a subsequently loaded software module freshly installed via the data bus cannot retrospectively influence or adversely affect the permanently installed operating module. This ensures that the permanently installed operating module continues to operate regardless of when additional software modules are "coupled" and operated.

Preferably, each software module in the control device is coupled by means of a software interface, each software interface being able to be addressed externally via the terminal.

Preferably, the control device has a software platform having a plurality of software interfaces. All the software modules in this case are coupled by means of the software interfaces of the software platform. With regard to compatibility among one another, it is considered to be advantageous if a plurality of, for example all, software interfaces of the software platform are in identical form such that each software module can be coupled to a plurality of or any software interface(s).

By way of example, the software platform is coupled to an operating system operating on the basis of the IEC 61850 standard.

To connect the measurement or protective appliance to measurement transducers, it preferably has a process bus terminal.

The invention also relates to a protective system having a measurement or protective appliance and a data bus which is connected to the measurement or protective appliance.

In this respect, the invention is based on the object of improving a protective system of this kind such that it very easily allows evaluation operations, particularly test operations, externally without necessitating reparameterization of the measurement or protective appliance.

The invention achieves this object by virtue of the data bus having an evaluation unit, particularly a tester, connected to it and the measurement or protective appliance being in a form such that it receives an evaluation or test software module supplied from the evaluation unit to the data bus for evaluation or test purposes and couples said module to a software interface and starts the evaluation or test software module.

For the advantages of the inventive protective system, reference is made to the comments above in connection with the inventive measurement or protective appliance.

The invention is also defined as a method for operating the described measurement or protective appliance; the method is defined in the patent claims. For the advantages of the inventive method, reference is made to the above comments in connection with the inventive measurement or protective appliance.

BRIEF DESCRIPTION OF THE SEVERAL VIEWS OF THE DRAWING

The invention is explained below with the aid of an exemplary embodiment; in the drawing.

DESCRIPTION OF THE INVENTION

Figure 1:
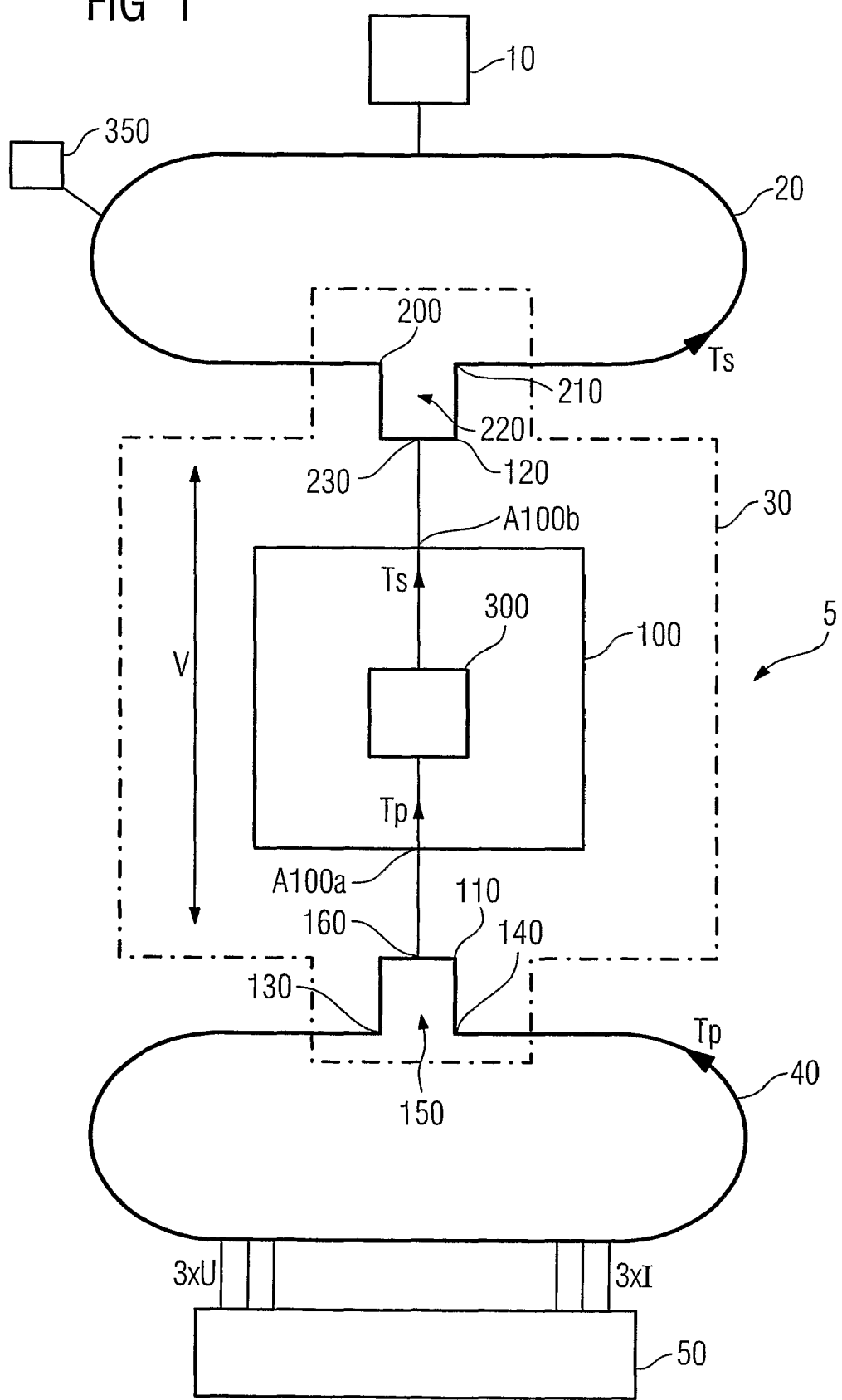
FIG. 1 shows an exemplary embodiment of an inventive protective system with an exemplary embodiment of an inventive measurement and/or protective appliance.

FIG. 1 shows an exemplary embodiment of an inventive protective system 5. The protective system 5 has a superordinate management system 10 which is connected to a measurement and/or protective appliance 30 by means of a superordinate data bus 20—called station bus below. In the illustration in FIG. 1, only a single such measurement and/or protective appliance 30 is shown for reasons of clarity; it goes without saying that the station bus 20 may also have a plurality of measurement and/or protective appliances 30 connected to it which receive and evaluate the messages which are on the station bus 20.

In addition, the measurement and/or protective appliance 30 is connected to a further data bus 40—subsequently called process bus—which allows the measurement and/or protective appliance 30 to be connected to one or more measurement transducers 50. The measurements transducers 50 are connected to phase conductors (not shown in FIG. 1) of an electrical mains at a mains frequency of 50 Hz or 60 Hz.

Furthermore, FIG. 1 shows the internal design of the measurement and/or protective appliance 30. It is possible to see a control device 100 which is connected to two full-duplex three-port network interface modules 110 and 120 physically included in the measurement and/or protective appliance. By way of example, the three-port network interface modules 110 and 120 may be those which are described in German laid-open specification DE 102 60 806 A1.

One of the two three-port network interface modules 110 has two external ports 130 and 140 which allow an interface 150 for connecting the measurement and/or protective appliance 30 to the process bus 40. The term "port" is thus to be understood to mean an electrical bus terminal or bus interface. An internal port 160 of one three-port network interface module 110 is connected to a process-bus terminal A100a of the control device 100.

The further three-port network interface module 120 likewise has two external ports 200 and 210; these external ports 200 and 210 form an interface or a terminal 220 for connecting the measurement and/or protective appliance 30 to the superordinate data bus formed by the station bus 20. An internal port 230 of the further three-port network interface 120 is connected to a station-bus terminal A100b of the control device 100.

The two three-port network interface modules 110 and 120 and also the control device 100 are shown in FIG. 1 as separate elements which the measurement and/or protective appliance 30 contains. Preferably, the two three-port network interface modules 110 and 120 and the control device 100 are formed by a single physical unit, preferably by a user-programmable gate array, for example a monolithically integrated array.

FIG. 1 also shows a tester 350 which is connected to the station bus 20 and it is intended to be used to test the measurement and/or protective appliance 30.

The protective system 5 shown in FIG. 1 works as follows:

The measurement transducers 50 produce phase-conductor-based samples U and I which are transmitted via the process bus 40 to the measurement and/or protective appliance 30 in the form of messages Tp.

When processing the phase-conductor-based samples U and I from the measurement transducers 50, the measurement and/or protective appliance 30 performs "downsampling", for example. This means that the number of samples which are delivered by the measurement transducers 50 is reduced before being forwarded to the station bus 20, for example by rejecting nine of ten samples from the measurement transducers 50 and collecting only a single sample in each case. If the sampling rate on the measurement transducers 50 is 10 kHz or 20 kHz, for example, then just a sampling rate of 1 or 2 kHz is forwarded on the station bus in the form of the messages Ts. Despite the reduction in the sampling rate, "transparency" of the measured values—as seen from the superordinate station bus 20—is nevertheless retained because despite only every tenth sample being transmitted still sufficient measured values reach the station bus 20 which sufficiently characterizes the respective measured value situation on each of the measurement transducers 50. The resultant transparency is identified schematically in FIG. 1 via the reference symbol V.

Instead of the sample reduction described, where only every n-th (e.g. n=10) sample is used further, data reduction can also be effected by converting the samples into complex measured value pointers. In this variant, the measurement and/or protective appliance 30 takes the received phase-conductor-based samples U and I from the measurement transducers 50 and ascertains complex measured value pointers which indicate the absolute value and the phase of the current or voltage on the associated phase conductors. In the case of such data reduction using "pointer conversion", the data rate can be reduced very significantly, so that, by way of example, a transmission rate of 50 Hz is sufficient in order to characterize the measured values from the current transformer 50.

The "downsampling" described and/or the pointer conversion can be performed in the control device 100, for example using digital signal processors, one of which is identified by way of example in FIG. 1 with the reference symbol 300.

The result of the data reduction described is therefore that the station bus 20 is no longer used to transmit all samples which have reached the measurement and/or protective appliance 30 on the process bus. If the tester 350 is now intended to be used to establish whether the measurement and/or protective appliance 30 or the measurement transducers 50 are operating correctly then this is not possible directly from the station bus 20, since not all the necessary information is available. One option of obtaining all the samples received from the measurement and/or protective appliance 30 would now be, by way of example, to alter the mode of operation of the measurement or protective appliance 30 by reparameterizing the measurement or protective appliance. However, such reparameterization is—as described at the outset—complex and risky because errors can arise and the mode of operation of the measurement or protective appliance 30 could be totally or fully impaired.

To prevent this, the control device 100 has the option of operating additional software modules in parallel with and independently of one another. This is shown schematically in FIG. 2.

The software module stipulating the measurement and/or protection mode of operation of the measurement or protective appliance 30 is referred to below as an operating module and is identified by the reference symbol 400 in FIG. 2. The operating module 400 can be parameterized externally using the terminal 220 via the station bus 20; this means that input of operating parameters can modify the mode of operation of the operating module 400 externally; alternatively, the operating module may also be "unparameterizable" in invariable form.

Figure 2:
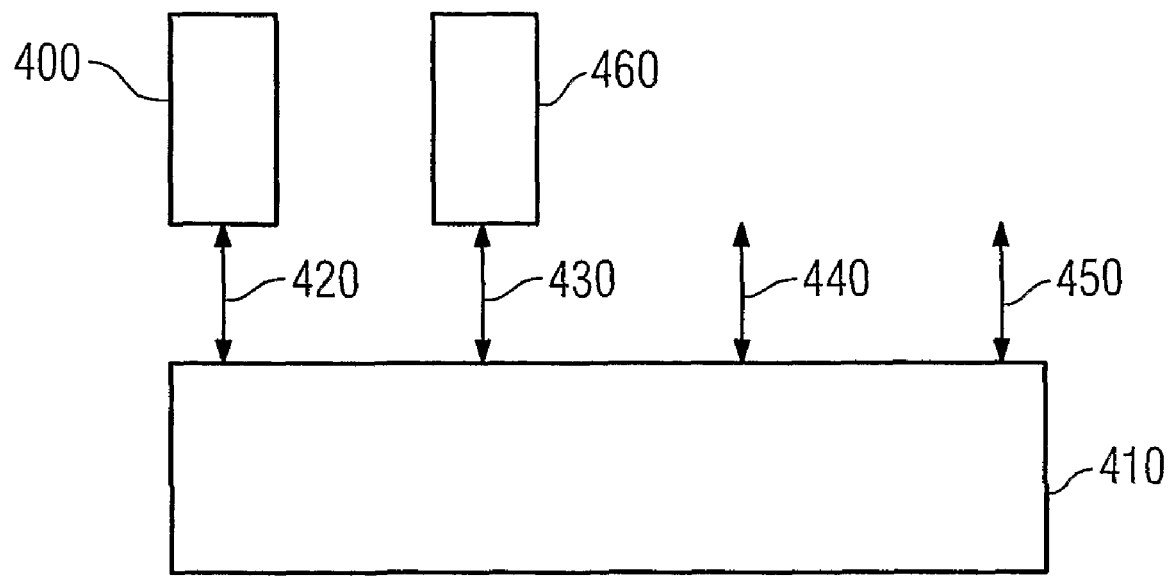
FIG. 2 shows an exemplary embodiment of a software platform for coupling software modules for the measurement and/or protective appliance shown in FIG. 1.
Figure 2:
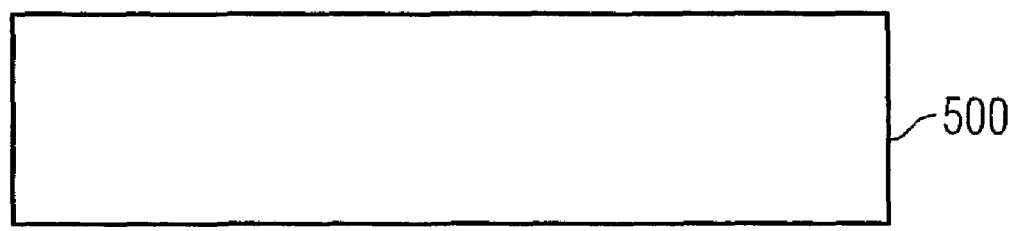
Figure 2:
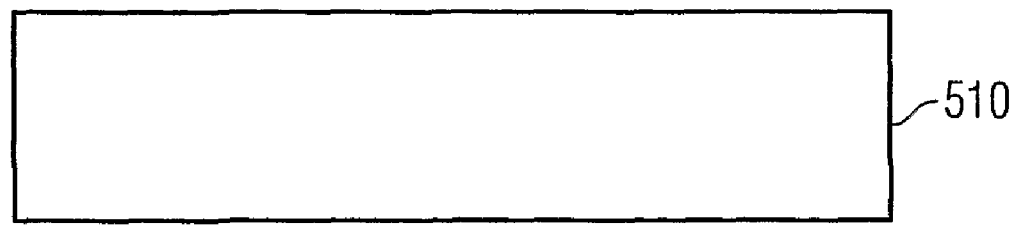

FIG. 2 shows that the operating module 400 is coupled to a software platform 410 which, to this end, has a software interface 420. In addition, the software platform 410 is equipped with further software interfaces 430, 440 and 450 which allow additional software modules to be coupled.

FIG. 2 identifies an additional software module of this kind by the reference symbol 460. This additional software module is a test module which the tester 350 has installed in the measurement and/or protective appliance 30 for test purposes via the station bus 220 (cf. FIG. 1) by coupling it to the further software interface 430 and then starting it.

The software platform 410 is in a form such that it can operate the operating module 400 and the test module 460 in parallel with and completely separate from one another; reciprocal influencing of the operating module 400 and of the test module 460 is therefore precluded. Operating systems which allow simultaneous execution of different software modules—also called applications—are common knowledge today (e.g. Unix, Windows, etc.).

By way of example, the test module 460 is now programmed such that it evaluates the received phase-conductor-based samples U and I from the measurement transducers 50 directly; it therefore does not resort to the reduced-sampling-rate messages Tp from the operating module 400. A test engineer working on the tester 350 therefore has direct access to all the data applied to the input of the measurement and/or protective appliance 30, so that he can perform all the desired test procedures. In other words, the test module 460 allows 100% data transparency up to and including the measurement transducer level.

As FIG. 2 reveals, the software platform 410 may be based on an operating system 500 which can manage an "object directory" based on the IEC 61850 standard, for example. The operating system 500 may run on an IEC 61850-compatible communication stack 510, for example.

In the case of the exemplary embodiment shown in FIGS. 1 and 2, the mode of operation of the tester 350 and the ability of software modules to be coupled have been explained for the situation in which the tester 350 is connected to the station bus 20. Accordingly, the tester 350 may also be coupled to the process bus 40 so as to install additional software modules in the measurement and/or protective appliance 30 from there. In this case, the process bus 20 performs the function of a "superordinate" data bus, and the terminal for supplying the software modules is formed by the interface 150.

LIST OF REFERENCE SYMBOLS

5 Protective system
10 Superordinate management system
20 Station bus
30 Measurement and/or protective appliance
40 Process bus
50 Measurement transducer
100 Control device
110 Three-port network interface module
120 Further three-port network interface module
130, 140 External ports of the one three-port network interface module
150 An interface
160 Internal port of the one three-port network interface module
200, 210 External ports of the further three-port interface module
220 Further interface
230 Internal port of the further three-port network interface module
300 Signal processor
350 Tester
400 Operating module
410 Software platform
420 Software interface
430 Further software interface
440 Further software interface
450 Further software interface
460 Additional software module
500 Operating system
510 Communication stack
U, I Current and voltage samples
Ts, Tp Messages

The invention claimed is:

1. A measurement or protective device, comprising:
a terminal for establishing a connection to a data bus;
a control device configured to stipulate a measurement or protective mode of operation of the measurement or protective device, wherein the mode of operation may be changed externally via said terminal;
said control device being configured to operate at least two software modules in parallel with one another and independently of one another, said software modules including an operating module configured to stipulate the measurement or protective mode of operation of the measurement or protective device, and at least one test module configured to perform test purposes; and
said control device having at least one software interface to which said at least one test module can be coupled by software means externally via said terminal;
wherein the measurement or protective device is connected to one or more measurement transducers, that produce phase-conductor-based samples which are transmitted to the measurement or protective device;
wherein the control device is configured to downsample the samples by reducing the number of samples; and
wherein the test module is configured to evaluate the received phase-conductor-based samples from the one or more measurement transducers directly without resorting to the reduced number of samples.

2. The measurement or protective device according to claim 1, wherein said operating module is parameterized by inputting operating parameters externally via said terminal.

3. The measurement or protective device according to claim 1, wherein:
each said software module is coupled in said control device by way of a respective software interface; and
each said software interface is externally addressable via said terminal.

4. The measurement or protective device according to claim 1, wherein:
said control device has a software platform having a plurality of software interfaces; and
each of said software modules are respectively coupled to said software platform by way of a respective said software interface.

5. The measurement or protective device according to claim 4, wherein said software interfaces of said software platform are mutually identical interfaces, allowing each software module to be coupled to any said software interface.

6. The measurement or protective device according to claim 4, wherein said software platform is coupled to an operating system that is compatible with an IEC 61850 standard.

7. The measurement or protective device according to claim 1, which comprises a further terminal for establishing a connection to at least one measurement transducer.

8. A protective system, comprising:
a measurement or protective device according to claim 1;
a data bus connected to said measurement or protective device; and
a tester connected to said data bus;
wherein said measurement or protective device is configured to receive a test module supplied from said tester to said data bus and to couple said test module to a software interface.

* * * * *